US006658249B1

(12) United States Patent
Hietalahti et al.

(10) Patent No.: US 6,658,249 B1
(45) Date of Patent: Dec. 2, 2003

(54) METHOD AND ARRANGEMENT FOR SETTING DATA TRANSFER PARAMETERS IN A DATA TRANSFER SYSTEM

(75) Inventors: Hannu Hietalahti, Kiviniemi (FI); Tapio Saarinen, Kello (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/367,333

(22) PCT Filed: Feb. 11, 1998

(86) PCT No.: PCT/FI98/00120

§ 371 (c)(1),
(2), (4) Date: Aug. 11, 1999

(87) PCT Pub. No.: WO98/36589

PCT Pub. Date: Aug. 20, 1998

(30) Foreign Application Priority Data

Feb. 12, 1997 (FI) .................................................. 970596

(51) Int. Cl.⁷ .................................................. H04Q 7/20
(52) U.S. Cl. ..................... 455/422.1; 455/450; 455/419
(58) Field of Search ................................ 455/419, 516, 455/506, 517, 509, 450, 452, 403, 455, 550, 560, 435, 466, 422, 571, 522; 379/93.01, 90.01; 370/252, 328, 338, 341, 348, 389, 351, 352

(56) References Cited

U.S. PATENT DOCUMENTS

| 5,297,192 A | * | 3/1994 | Gerszberg ..................... 379/59 |
| 5,487,175 A | * | 1/1996 | Bayley et al. ............. 453/54.2 |
| 5,598,417 A | * | 1/1997 | Crisler et al. ................ 370/348 |
| 5,799,255 A | | 8/1998 | Berg et al. .................... 455/551 |
| 5,802,465 A | * | 9/1998 | Hamalainen et al. ....... 455/403 |
| 5,950,124 A | * | 9/1999 | Trompower et al. ........ 455/422 |
| 6,157,634 A | * | 12/2000 | Mehta et al. ................ 370/351 |
| 6,167,280 A | * | 12/2000 | Barrett et al. ............... 455/466 |

FOREIGN PATENT DOCUMENTS

| FI | WO 96/10320 | * | 4/1996 | ............ H04Q/7/22 |
| SE | WO 96/35300 | * | 11/1996 | ............ H04Q/7/24 |
| WO | WO 96/10320 | | 4/1996 | |
| WO | WO 96/35300 | | 11/1996 | |

* cited by examiner

Primary Examiner—Edward F. Urban
Assistant Examiner—C. Chow
(74) Attorney, Agent, or Firm—Perman & Green, LLP

(57) ABSTRACT

A method and an arrangement for setting data transfer parameters in a data transfer system is disclosed for use preferably in a digital cellular system. A data transfer connection may be established by setting first the parameters related to speech connection and then, during the speech connection, the data transfer parameters can be changed, when necessary to be suitable for data transfer. Then, at call setup, no data is needed on whether the data transfer connection is possibly to be used for data transfer.

10 Claims, 3 Drawing Sheets

Figure 1A:
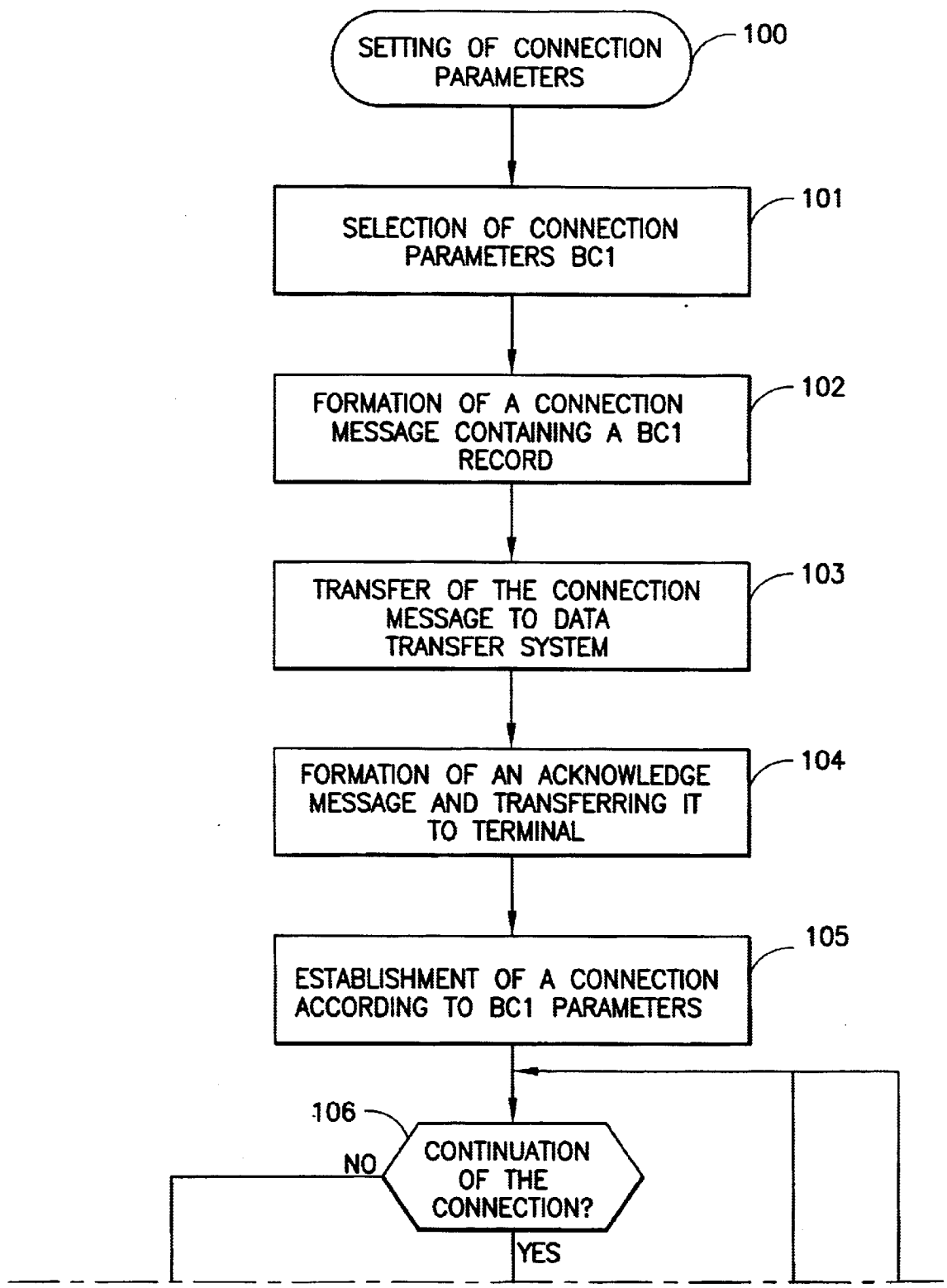

METHOD AND ARRANGEMENT FOR SETTING DATA TRANSFER PARAMETERS IN A DATA TRANSFER SYSTEM

The invention relates to a method and an arrangement for setting data transfer parameters in a data transfer system. The invention is applied preferably in a digital cellular system for changing a channel configuration during a connection.

In digital cellular systems the connection parameters are generally set in the context of the establishment of a data transfer connection before the data transfer connection intended for the transfer of user information is established. For example in a GSM (Global System for Mobile Communications) system connection parameters of this kind are amongst others a codec which defines a data transfer rate coding and parameters defining speech data and fax transfer functions. Codecs currently in use are HR (Half Rate). FR (Full Rate) and EFR (Enhanced Full Rate) codecs. Of these the FR codec can be selected according to the GSM system standard for all devices connected to the system but the HR and EFR codecs are optional in the devices. Connection parameters of a data link contain amongst others specifications concerning bits and bytes to be transferred. In the following first a prior known procedure is described for setting connection parameters in a GSM system and thereafter the disadvantages associated with the prior art.

Prior to the establishment of a data transfer connection a message for the establishment of the connection is transmitted from a mobile station to the data transfer system and it contains data concerning capabilities of devices for data transfer in BC (Bearer Capability) data fields reserved for this purpose. When the mobile station has transmitted the message concerned to the data transfer system the data system verifies the compatibility of the parameters contained in the message. Thereafter, the system transmits an acknowledge message to the mobile station confirming the reception of the message establishing the connection and the data concerning whether the suggested parameters are compatible. In case that the suggested parameters are not compatible it is possible to negotiate the parameters and change some of the parameters by transmitting new parameters in the acknowledge message.

In a BC data field, one can, for example, state that the terminal is capable of data transfer at the HR and FR data transfer rate. Then during the connection the data transfer system uses one of the data transfer rates concerned. The data transfer rate can be changed during the connection, for example, in the context of a change from one base station to the next (handover). Then, for example, those base stations which are capable of using the HR data transfer rate use it and the other base stations use the FR data transfer rate. The change of a codec occurs then controlled by the data transfer system within the framework of the BC data in use. The change of the codec is implemented by using a so-called ASSIGNMENT or HO (Handover) procedure.

In addition, a procedure for alternating speech connection and data connection is prior known. In this case, the message for establishing a connection to be transmitted during the establishment of connection contains two BC data fields. Of these, for example, the first data field BC1 is used for the configuration of the speech connection and the data field BC2 is used for the configuration of the data connection. During the connection the configuration in use can be changed between configurations BC1 and BC2 which were specified during the establishment of the connection. This change occurs by using a so-called ICM (In Call Modification) procedure.

The GSM system has been described in more detail, for example, in the publication [1] Mouly, Pautet; The GSM System for Mobile Communications 1992. ISBN 2-9507190-0-7.

There are many disadvantages associated with the solutions according to the prior art described above. First, a connection which has been set up as a plain speech connection cannot be converted to a data connection during the connection. If during a speech connection there arises a need, for example, to send a fax the speech connection has to be disconnected and a new connection established which is configured for a fax transfer in the stage of the establishment of connection. Although the need for several channel configurations would be known already at the establishment of connection, it is not possible to use more than two sets of connection parameters during the same connection in the solutions according to the prior art. Thus, for example, during a speech/data connection one cannot send faxes. Instead one must establish a new connection to perform this task.

Another disadvantage associated with the prior art is that one has to know the parameters of the data transfer connection already at the establishment of connection. If, for example, the device configuration of a terminal may vary parameters relating to the wrong device configuration may be selected when the connection is established, in which case the connection has to be established again for the correction of the parameters. Such a situation may arise especially for the reason that the peripheral attached to the terminal is not connected when the connection is established and the system reports this only after the connection has been established.

Problems arise especially in a situation where the appropriate data transfer parameters are not known at the establishment of connection but they have to be found out by trial and error. During this procedure, one has to establish many speech connections to agree on the trial parameters with the other party and many data connection trials for testing the agreed trial parameters.

Additionally, the use of the solutions according to the prior art is made difficult by the fact that separate subscriber numbers are usually required for speech, data and fax functions and for their transposition functions.

As is obvious from the above described examples, the procedure according to the prior art is in many operating situations multi-stage and awkward and therefore the total time needed for transferring the necessary data may become unreasonably prolonged.

One idea of the invention is that a procedure is devised for setting connection parameters during the data transfer connection. Then it is possible to change the channel configuration of the connection when necessary, independent of the configuration selected at the establishment of connection.

By means of the invention, many advantages are achieved compared to the prior art. By means of the solution according to the invention, data transfer connection can be established by setting first, for example, connection parameters relating to the speech connection and during the speech connection the connection parameters can be chanced so that they are suitable for data transfer when necessary. Thus, at the call setup, no information is needed on whether the data transfer connection will possibly be used for data and/or fax transfer nor information on the parameters to be used in this kind of transfer. During speech connection it is also possible to find out the operation of different data transfer parameters in the context of the terminals in use. Furthermore one advantage of the invention is that separate subscriber numbers needed for speech fax and data transfer functions and their transposition functions (multiple nubering scheme) can be substituted by a single subscriber number (single numbering scheme). Thus the invention makes the single numbering scheme a viable solution.

A method according to the invention for setting data transfer connection parameters in a data transfer system is characterized in that the connection parameters which are to be used in the data transfer connection are selected after the establishment of the data transfer connection data referring to the selected connection parameters is transferred between the terminal and the data transfer system and the connection parameters used by the data transfer connection are changed to be compatible with the transferred connection parameters.

A data transfer system according to the invention comprising the means for transferring the first connection parameters between said data transfer system and a terminal connected to it and the means for establishing data transfer connection on a traffic channel on the basis of said first connection parameters is characterized in that it comprises the means for transferring the second connection parameters between said data transfer system and said terminal during said data transfer connection and the means for changing the connection parameters used in said data transfer connection on the basis of said second data transfer parameters.

A terminal according to the invention comprising the means for transferring the first data transfer parameters between the terminal and the data transfer system and the means for establishing data transfer connection to the data transfer system on the basis of said first data transfer parameters is characterized in that the terminal comprises the means for transferring the second data transfer parameters between the terminal and the data transfer system during said data transfer connection and the means for changing the connection parameters used in said data transfer connection on the basis of said second data transfer parameters.

Preferable embodiments of the invention have been presented in dependent claims.

Figures 1, 1A, 1B:
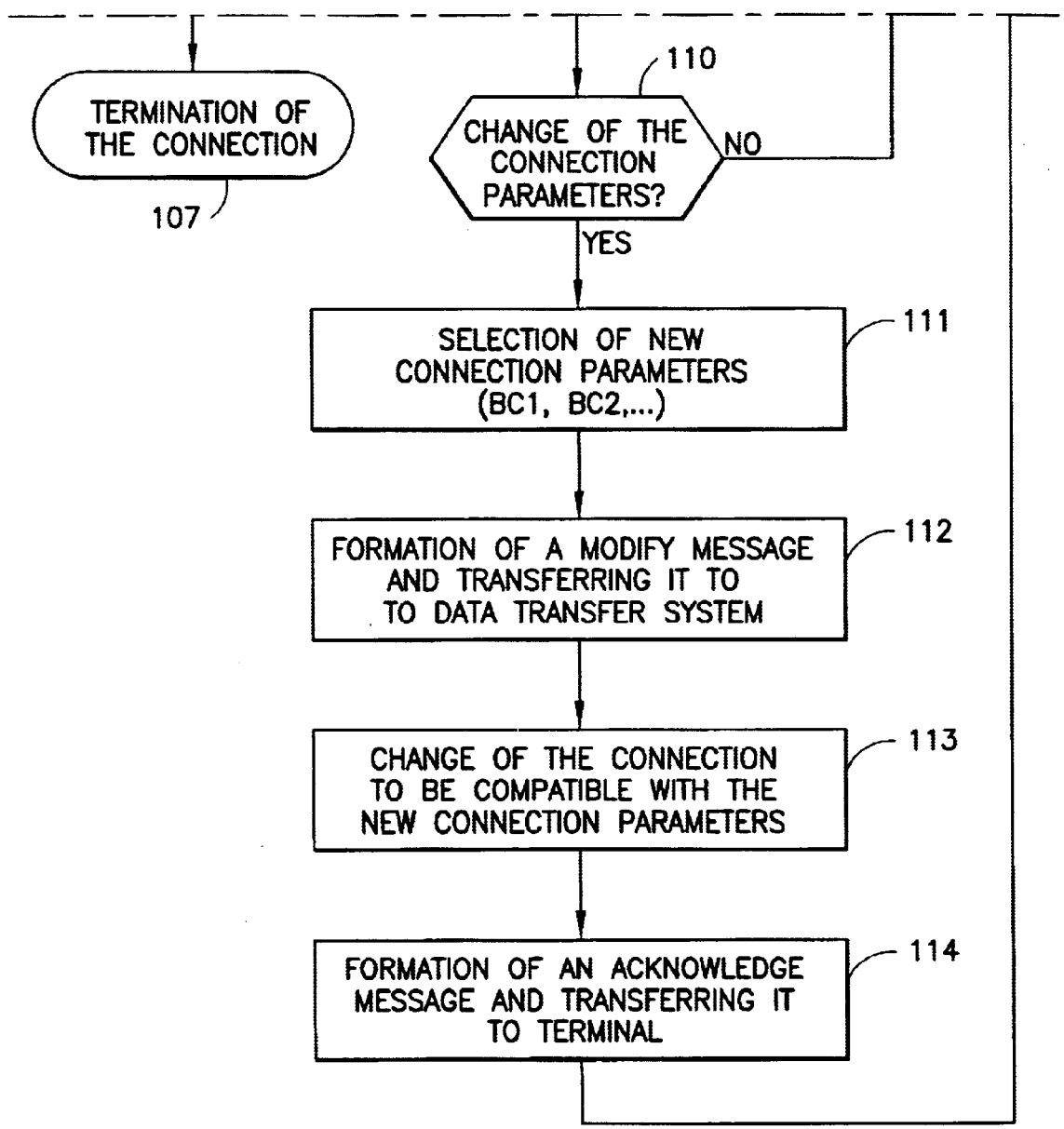
Figure 2:
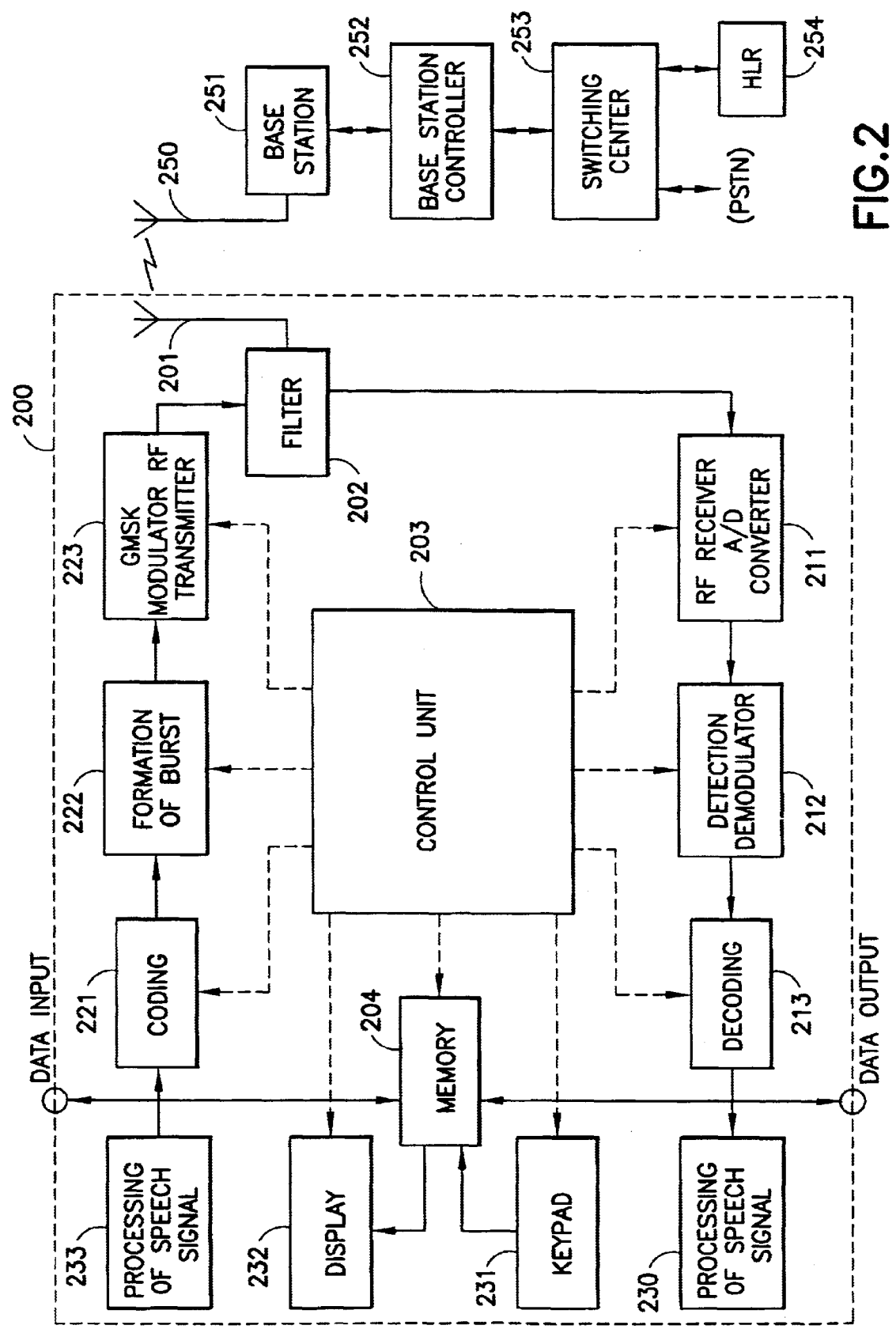

The invention is described in the following in more detail by means of the attached drawings in which FIG. 1 shows a flow diagram of a method according to the invention for setting connection parameters and FIG. 2 shows a block diagram of a mobile station according to the invention and its connection to a cellular system according to the invention.

FIG. 1 shows a flow diagram of a method according to the invention for setting connection parameters 100. Prior to the establishment of connection the first connection parameters BC1 are selected phase 101. Thereafter, a message for the establishment of connection is formed in the terminal and it contains a record for transferring the connection parameters BC1, phase 102. The formed connection message is subsequently transferred to the data transfer system, phase 103. After receiving the connection message the data transfer system forms an acknowledge message and transmits it to the terminal, phase 104. Thereafter a data transfer connection is established by using a channel configuration according to the selected connection parameters BC1, phase 105.

When the connection has become established the channel configuration defined at the establishment of the connection is used until it is necessary to terminate the connection phases, 106, 107 or until it is desired to change the connection parameters phase 110. When one desires to change the channel configuration new connection parameters BC2 are selected phase 111. Thereafter, a MODIFY message is formed which contains data of the new connection parameters and the MODIFY message is transmitted from the terminal to the data transfer system phase 112. After having received the MODIFY message, the data transfer system verifies the compatibility of the suggested parameters and changes the channel configuration of the connection to be compatible with the new connection parameters phase 113. Thereafter, the data transfer system transmits to the terminal an acknowledge message MODIFY COMPLETE which contains a confirmation concerning the new channel configuration, phase 114 after which it is returned to phase 106. If the data transfer system does not support the channel configuration suggested in the MODIFY message, it transmits a MODIFY REJECT message as an announcement that the connection parameters cannot be changed in the suggested way. The MODIFY REJECT message contains the connection parameters which were valid before the transfer of the MODIFY message.

The above described change of connection parameters can be performed several times during the connection. If one wishes to return to the earlier used channel configuration during the connection, also then a new MODIFY message is transmitted.

Above, the transfer of connection parameters in a message according to an ICM procedure of the GSM system has been described. Within the framework of the invention, also other procedures of message transfer for transferring new connection parameters can, however, be devised to the GSM system.

Above, a procedure for transferring messages has been described in a case when the change of connection parameters is activated from a mobile station. The connection parameters can naturally be changed so that they also are activated by the data transfer system, in which case the data transfer system transmits to the terminal a MODIFY message containing the selected new connection parameters. Thereafter, the terminal transmits an acknowledge message MODIFY COMPLETE to the data transfer system which after having received the message readjusts the connection parameters to the selected new parameters. If the terminal does not accept the suggested connection parameters, it transmits a MODIFY REJECT message containing the valid connection parameters to the data transfer system. After having received this message, the data transfer system leaves the connection parameters unchanged.

FIG. 2 shows a simplified block diagram of a mobile station 200 according to the invention and its connection to the cellular system. In FIG. 2 only the essential parts of the mobile station considering the application of the invention have been shown. The mobile station comprises an antenna 201 for receiving a radio frequency signal i.e. an RF signal transmitted by a base station. The received RF signal is controlled, for example, by a duplex filter 202 to an RF receiver 211 in which the signal is amplified and converted into a digital form. Thereafter, the signal is detected and demodulated, block 212, and decoding is performed in block 213 according to the connection parameters.

If the connection has been defined as a speech connection, speech signal processing is performed to the received signal and in it the signal is also converted into sound, block 230. If the connection has been defined as a fax or data connection the decoded data can be transferred to an external data processing device through an interface in the mobile station. Alternatively, the received data can be processed in the mobile station, for example, by storing data in a memory 204 and showing it on a display 232. Respectively, the messages received from the data transfer system can be stored in the memory 204 and shown on the display 232 when necessary.

The above mentioned processing operations of data transfer are controlled by a control unit 203. The control unit also performs the formation and interpretation of the messages according to the invention.

For transmission of speech in a mobile station there is a processing block for a speech signal 233 which converts an acoustic signal into a digital electric signal. If the information to be transmitted is data it can be read from the memory 204 or received from an external data processing device through an external interface. Thereafter, the data to be transmitted is coded in block 221 according to selected connection parameters. From the coded data bursts are formed block 222, which are modulated into an RF signal to be transmitted in block 223. The RF signal to be transmitted is transferred to an antenna 201, for example, through a duplex filter 202. Also the above mentioned data processing and transmitting functions are controlled by the control unit 203.

The blocks of the mobile station according to the invention can be formed by means of components known per se. A control unit controlling other blocks however, performs the control operations for the blocks according to distinct software and thus the above described functions of the blocks according to the invention are achieved.

FIG. 2 shows additionally the parts of a cellular system which are used in the establishment of connection and data transfer. The RF signal is transmitted and received through an antenna 250 of a base station 251. Data transfer connection is established from the base station 251 further to a switching center 253 through a base station controller 252. The switching center 253 is additionally linked to other base stations of the system and, for example, to the public switched telephone network PSTN. The other party of the data transfer connection can gain access to the data transfer system via the base station such as a mobile station 200 or alternatively via a fixed telephone network PSTN.

The functions according to the invention are performed in the base station of a cellular system by similar means as in a mobile station.

Only some embodiments of the invention have been described above. The principle according to the invention can naturally be modified within the frame of the scope determined by the claims, for example, by modification of the details of the implementation and ranges of use.

Especially the GSM data transfer system has been described only as examples and the application of the invention is in no way restricted to it. The invention can preferably be used amongst others, in GSM, PCN, DCS, UMTS or FPLMTS cellular systems. The invention can be applied in addition to the mobile station systems, also for fixed data transfer systems, such as, for example, in ISDN and B-ISDN systems.

What is claimed is:

1. A method for setting data transfer connection parameters between a mobile terminal and a data transfer system, comprising the steps of:

setting first connection parameters to be connection parameters of a data transfer connection;

establishing a data transfer connection using said first connection parameters;

selecting second connection parameters after the establishment of said data transfer connection and during said data transfer connection;

during said data transfer connection, sending a modify connection parameters message between the terminal and the data transfer system, said message including said second connection parameters wherein one of said first connection parameters and said second connection parameters are for speech transmission and the other is for data and/or facsimile transmission; and changing said first connection parameters of said data transfer connection to said second connection parameters during said data transfer connection.

2. A method according to claim 1, characterized in that during the data transfer connection, at least three sets of connection parameters are used.

3. A method according to claim 1, characterized in that said data transfer system is substantially a GSM system.

4. A method according to claim 1, characterized in that said data transfer system is a GSM, PCN, DCS, UMTS, FPLMTS, ISDN or B-ISDN system.

5. A system for transferring data between a mobile terminal and a data transfer system comprising:

means for setting first connection parameters for establishing a data transfer connection between said data transfer system and said terminal;

means for establishing a data transfer connection on a traffic channel based on said first connection parameters;

means for selecting second connection parameters after the establishment of said data transfer connection and during said connection;

means for sending a modify connection parameters message between the terminal and the data transfer system, during said data connection, said message including said second connection parameters wherein one of said first connection parameters and said second connection parameters are for speech transmission and the other is for data and/or facsimile transmission; and means for changing said first connection parameters of said data transfer connection to said second connection parameters during said data transfer connection.

6. A data transfer system according to claim 5, characterized in that said data transfer system is substantially a GSM system.

7. A data transfer system according to claim 5, characterized in that said data transfer system is a GSM, PCN, DCS, UMTS, FPLMTS, ISDN or B-ISDN system.

8. A terminal for transferring and receiving data to and from a data transfer system comprising:

means for setting first connection parameters for establishing a data transfer connection between said data transfer system and said terminal;

means for establishing a data transfer connection on a traffic channel based on said first connection parameters;

means for selecting second connection parameters after the establishment of said data transfer connection and during said data transfer connection;

means for sending a modify connection parameters message between the terminal and the data transfer system, during said data transfer connection, said message including said second connection parameters wherein one of said first connection parameters and said second connection parameters are for speech transmission and the other is for data and/or facsimile transmission; and means for changing said first connection parameters of said data transfer connection to said second connection parameters during said data transfer connection.

9. A terminal according to claim 8, characterized in that said data transfer system is substantially a GSM system.

10. A terminal according to claim 8, characterized in that said data transfer system is a GSM, PCN, DCS, UMTS, FPLMTS, ISDN or B-ISDN system.

* * * * *